(12) United States Patent
Chamberlain et al.

(10) Patent No.: US 9,141,453 B2
(45) Date of Patent: Sep. 22, 2015

(54) REDUCED FOOTPRINT CORE FILES IN STORAGE CONSTRAINED ENVIRONMENTS

(71) Applicant: International Business Machines Corporation, Armonk, NY (US)

(72) Inventors: Richard N. Chamberlain, Winchester (GB); Blazej Czapp, London (GB); Howard Hellyer, Winchester (GB); Matthew F. Peters, Winchester (GB); Adam J. Pilkington, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/709,441

(22) Filed: Dec. 10, 2012

(65) Prior Publication Data
US 2013/0166968 A1   Jun. 27, 2013

(30) Foreign Application Priority Data
Dec. 21, 2011   (GB) .................................. 1121990.4

(51) Int. Cl.
*G06F 11/00* (2006.01)
*G06F 11/07* (2006.01)

(52) U.S. Cl.
CPC .......... *G06F 11/006* (2013.01); *G06F 11/0778* (2013.01)

(58) Field of Classification Search
CPC .................................................. G06F 11/0706
See application file for complete search history.

(56) References Cited

U.S. PATENT DOCUMENTS

| | | |
|---|---|---|
| 5,293,612 A | 3/1994 | Shingai |
| 6,681,348 B1 | 1/2004 | Vachon |
| 6,738,928 B1 | 5/2004 | Brown |
| 7,028,056 B1 | 4/2006 | Hendel et al. |
| 7,178,068 B2 | 2/2007 | Maison et al. |
| 7,496,794 B1 * | 2/2009 | Eastham et al. ................. 714/37 |
| 2005/0228960 A1 | 10/2005 | Francis et al. |
| 2008/0126879 A1 | 5/2008 | Tiwari et al. |
| 2008/0294839 A1 | 11/2008 | Bell et al. |
| 2009/0216967 A1 | 8/2009 | Sugawara |
| 2011/0231710 A1 * | 9/2011 | Laor .......................... 714/38.11 |
| 2014/0075244 A1 * | 3/2014 | Takahashi .................... 714/38.1 |

FOREIGN PATENT DOCUMENTS

EP   1215578 A2   6/2002

OTHER PUBLICATIONS

UK International Search Report for Application No. GB1121990.4, International Filing Date Apr. 10, 2012; pp. 1-3.
Y. Huang et al., "Optimizing Crash Dump in virtualized Environments." VEE Mar. 17-19, 2010, pp. 1-12.

* cited by examiner

*Primary Examiner* — Christopher McCarthy
(74) *Attorney, Agent, or Firm* — Cantor Colburn LLP; Dermotte Cooke

(57) ABSTRACT

A method for creating diagnostic files that includes receiving an error notification indicating that an error has occurred in a particular system section of a system that has a plurality of system sections. The error notification includes information about the error. A diagnostic file that includes a summarized error report of the particular system section is created based on the information included in the error notification. The diagnostic file is saved.

20 Claims, 11 Drawing Sheets

REDUCED FOOTPRINT CORE FILES IN STORAGE CONSTRAINED ENVIRONMENTS

PRIORITY

This application claims priority to Great Britain Patent Application No. 1121990.4, filed 21 Dec. 2011, and all the benefits accruing therefrom under 35 U.S.C. §119, the contents of which in its entirety are herein incorporated by reference.

BACKGROUND

The present invention relates generally to computers, and more specifically, to reducing the footprint of core files in storage constrained environments.

A core file is a file that contains a memory image of a process. Many operating systems have the capability of saving a core file when an application abends. The core file is an important part of diagnosing a cause of the abend, since the data which the application was accessing at the time is in the core file, along with information about which part of the application was running at the time of the abend.

In environments where process memory space usage exceeds the amount of storage space or transmission bandwidth, storing a complete image of the memory is not practical. Examples of these environments include 64 bit processes using terabytes (TBs) of data in random access memory (RAM), mobile devices, embedded devices, and large cache based systems. Mobile and embedded devices connect to servers over a network, and when an error occurs the device needs to get the core information and hence the core files to the server quickly in case the error degrades or eliminates the network connection. Large cache based systems include mobile networks where large amounts of data are cached at the network edge, but there is little storage available and a limited amount of bandwidth. One approach is to compress the resultant core file and this can save some space but may be costly in terms of processing time. Another solution is to omit areas of the address space, but this has the downside of possibly leaving out memory that is needed.

SUMMARY

An embodiment is a method for creating diagnostic files that includes receiving an error notification indicating that an error has occurred in a particular system section of a system that has a plurality of system sections. The error notification includes information about the error. A diagnostic file that includes a summarized error report of the particular system section is created based on the information included in the error notification. The diagnostic file is saved.

Another embodiment is a system for creating diagnostic files that includes a plurality of system sections, an error buffer, and an error engine. The error buffer is configured to receive an error notification indicating that an error has occurred in a particular system section of the plurality of system sections. The error notification includes information about the error. The error engine is configured to create a diagnostic file that includes a summarized error report of the particular system section and to save the diagnostic file. The diagnostic file is created based on the information included in the error notification.

A further embodiment is a computer program product for creating diagnostic files. The computer program product includes a computer readable storage medium having program code embodied therewith. The program code is executable by a processor to receive an error notification indicating that an error has occurred in a particular system section of a system having a plurality of system sections. The error notification includes information about the error. The program code is also executable by the processor to create a diagnostic file that includes a summarized error report of the particular system section and to save the diagnostic file. The diagnostic file is created based on the information included in the error notification.

BRIEF DESCRIPTION OF THE SEVERAL VIEWS OF THE DRAWINGS

Embodiments of the invention will now be described, by means of example only, with reference to the accompanying drawings in which.

DETAILED DESCRIPTION

Figure 1:
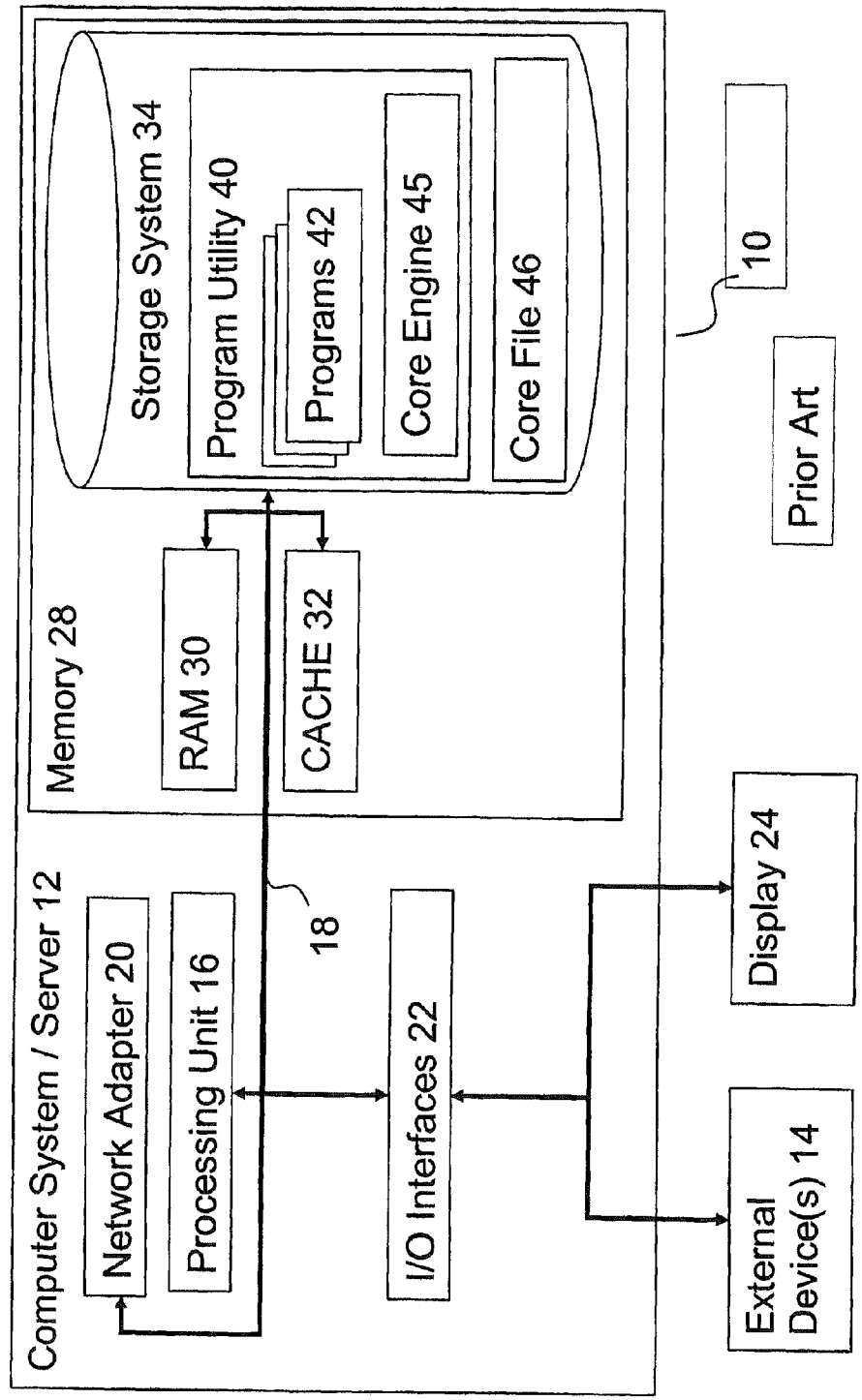
FIG. 1 is a deployment diagram of a computing system showing a core file of the prior art.

Referring to FIG. 1, a deployment diagram of a computing system showing a core file engine of the prior art is described. Computer system node 10 comprises a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be embodied in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computer system node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set of programs 42 and a core file engine 45 of the prior art, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Programs 42 generally carry out the functions and/or methodologies of embodiments of the invention as described herein. Core file engine 45 controls the saving of core file 46 in memory.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

Figure 2:
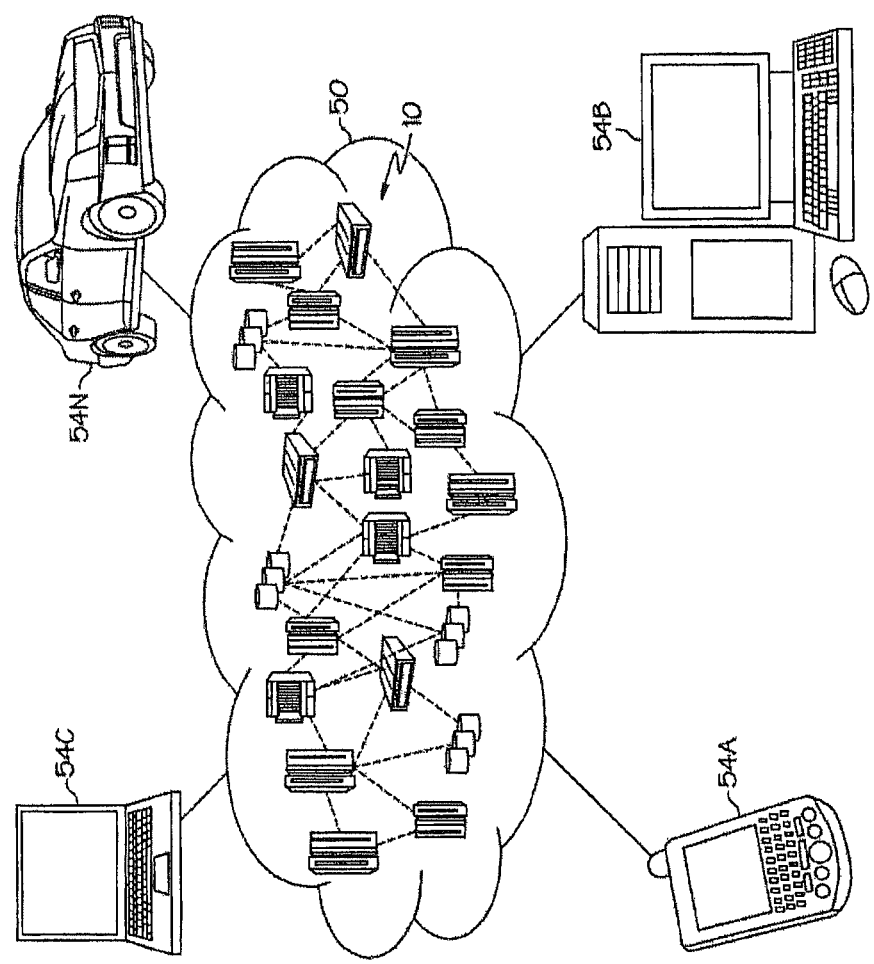
FIG. 2 is a network diagram illustrating computing nodes in a prior art cloud environment 50 where a core file could be acquired.

Referring to FIG. 2, illustrative computing nodes in cloud environment 50 are described. A core file engine could be used in any of these nodes for saving a core file. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (for example using a web browser).

Figure 3:
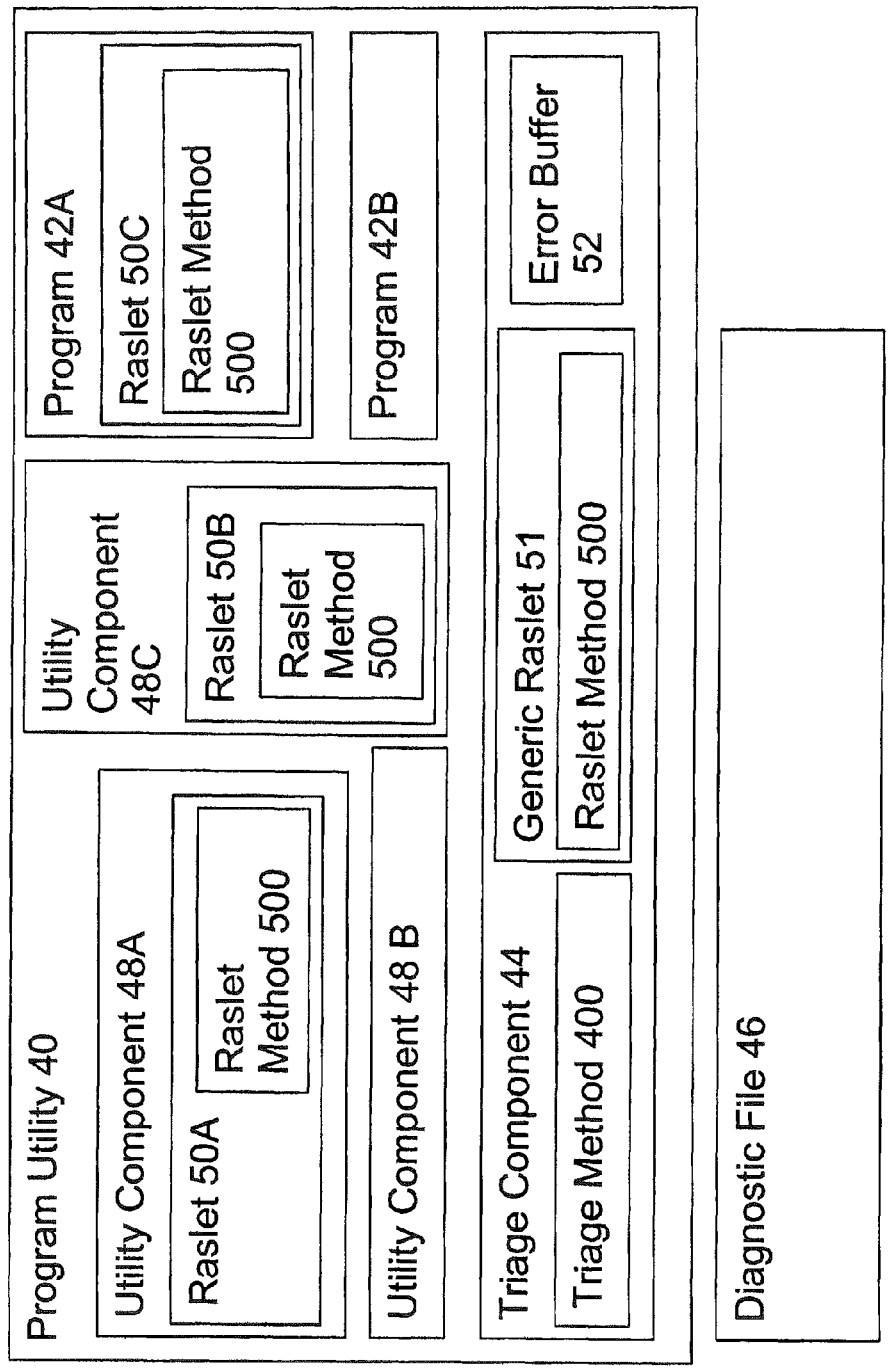
FIG. 3 is component diagram of a program utility in accordance with an embodiment.

Referring to FIG. 3, a component diagram of program utility 40 in accordance with an embodiment is shown. Program utility 40 represents an operating system or virtual machine system that can be divided into small parts. In the present example the program utility is a Java Virtual Machine (JVM). Program utility 40 comprises: programs 42A to 42B; triage component 44; diagnostic file 46; and utility components 48A to 48C.

Programs 42A to 42B represent application level program code that normally provides for output and input at a user level. This example shows programs 42A to 42B but one or any number of programs can be part of the program utility.

Triage component 44 is for creating a core file 46 for recording a failure within a plurality of system sections. Triage component 44 comprises triage method 400 and error buffer 52. Triage component 44 is for determining whether a full or summarized error report is created for one or more sections (also referred to herein as "system sections") of the system. Triage component 44 is also for compiling a comprehensive full image file or summarized error report from one of more separate error reports using information included by the error signal. Triage component 44 is also for saving a diagnostic file including the compiled full or summarized error report. Triage component 44 is also for determining which raslets are to be requested to create error reports and for including in the diagnostic file depending on information included in an error notification. As used herein, the term "raslet" refers to a self-contained error engine, and the terms "raslet" and "self-contained error engine" are used interchangeably herein. A raslet provides capabilities for production of diagnostic output. Each raslet includes pre-allocated working memory, stack and algorithms for providing the diagnostic output. Triage component 44 controls communication between raslets 48A to 48C. Triage method 400 is described in more detail below with reference to FIG. 4. Error buffer 52 is for receiving an error signal indicating that an error has occurred in a particular section of the plurality of systems sections.

Diagnostic file 46 stores the output data in an embodiment.

Utility components 48A to 48C are the functional components of program utility 40. This example shows three programs but one or more could be part of program utility 40.

Raslets (50A, 50B, 50C) are part of program 42A, utility component 48A and utility component 48C in an embodiment. In embodiments, raslets may operate as master or slave devices. Each raslet 50A-50C is specifically associated with one or more system sections for performing a specialized determination as to whether a full or summarized error report is created for the respective one or more sections. Three raslets are shown in FIG. 3 but other embodiments could have fewer or more.

A raslet is responsible for individual system sections including pre-allocated working memory, stack and algorithms. In an embodiment, a raslet is partitioned into separate functional areas, each of which has a piece of code that provides capabilities for production of diagnostic output. In a raslet embodiment, the triage component responds to an error event for which diagnostics are required (triggered for example by a signal handler). The raslet or triage component is for determining the level of diagnostic output required from each component. Raslets can be invoked serially or sequentially. If an individual raslet fails, the triage component detects this and falls back to produce a simple memory dump of the failing component.

Program utility 40 is conceptually divided into system sections, where each section is a utility component or an individual program or program component. In an embodiment, the program utility 40 is a JVM and the utility components are, for example: garbage collection (GC); just-in-time compiler (JIT); virtual machine (VM); heap nurseries; and a tenured heap. The program components would be Java programs and/or a Java library. In other embodiments, each section in the system could be all components or all subsets of system memory. In an embodiment, three sections (48A, 48C and 48C) have a dedicated raslet associated with the respective section to determine whether a full or summarized error report is created and for creating a full or summarized error report of the particular section depending on information included by the error signal. Sections that are not associated with a dedicated error engine, that is sections 48B and 42B, are associated with a generic error engine or triage component 44 in an embodiment and the generic error engine (generic raslet 51) is for determining whether a full or summarized error report is created for those sections.

Any one of the utility components or programs could generate an error notification. An error notification indicates that an error has occurred in a particular section of the plurality of systems sections. An error notification contains information relating to the time the error occurred, the type of error that occurred and the section associated with the error occurrence.

Figure 4:
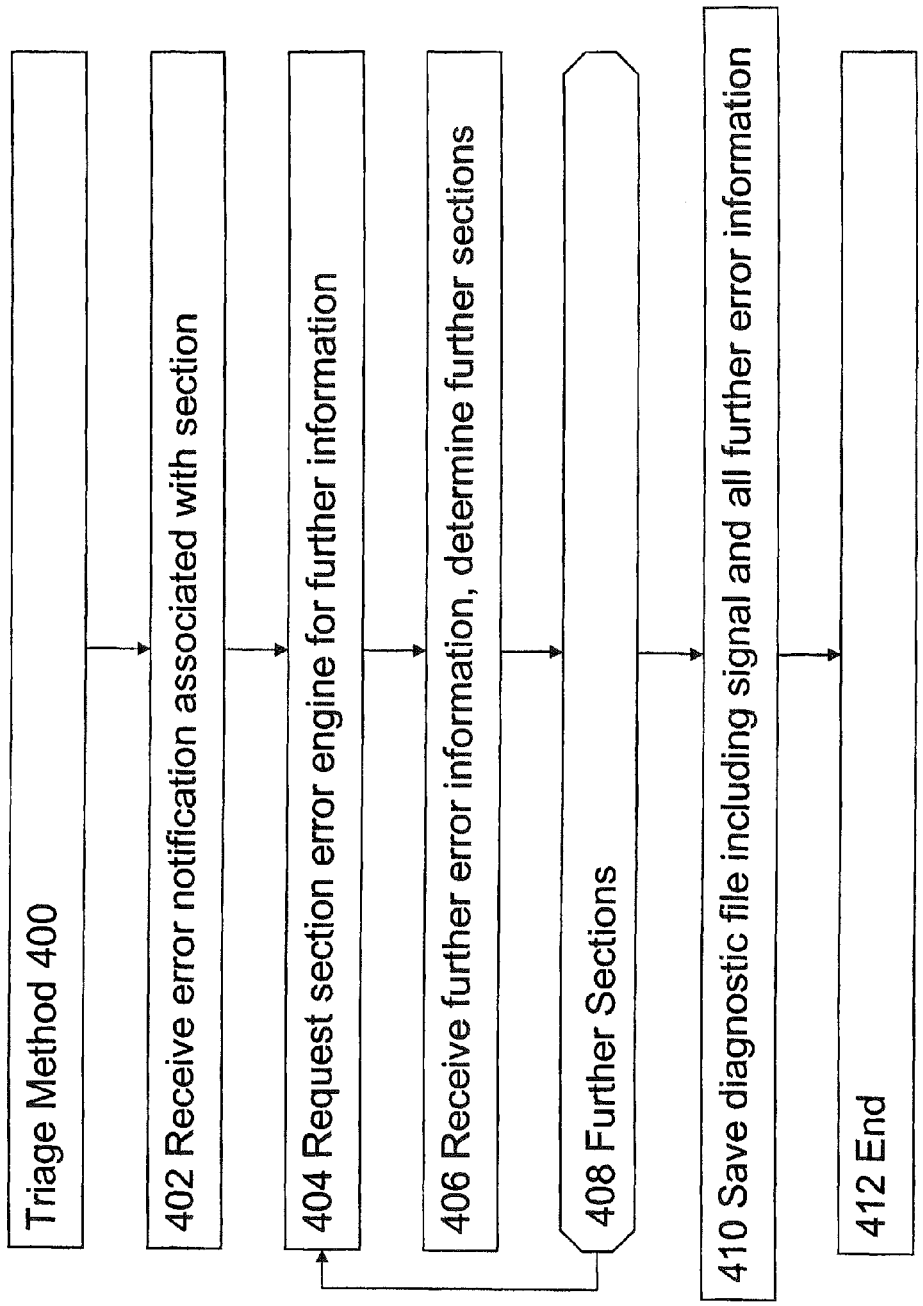
FIG. 4 is process diagram showing process logic steps of a triage method in accordance with an embodiment.

FIG. 4 is process diagram showing process logic steps of triage method 400 in accordance with an embodiment. In an exemplary embodiment, triage method 400 is performed by triage component 44 and comprises logical process blocks 402 to 410.

Block 402 is for receiving an error notification indicating that an error has occurred in a particular section of the plurality of systems sections.

Block 404 is for determining if a raslet is associated with the section and sending a request to the raslet for further information. If no raslet is associated then the triage component acting as a general raslet makes the determination about full or summarized error information.

Block 406 is for receiving the further information and for determining if it contains references to further sections and if such further sections should be queried for information relating to the error signal.

Block 408 is for counting further sections to be queried and determining when all sections have been considered. Such determination is evaluated based on section references contained in the further information received. For instance, the further information may contain references to one, two or more relevant sections that need to be queried. This step will loop back around blocks 404 and 406 for all referenced sections.

Block 410 is for creating a full or summarized error report of the particular section and further section and for saving a core file including a full or summarized error report for all relevant sections.

Block 412 is the end step and control is returned to the system.

Figure 5:
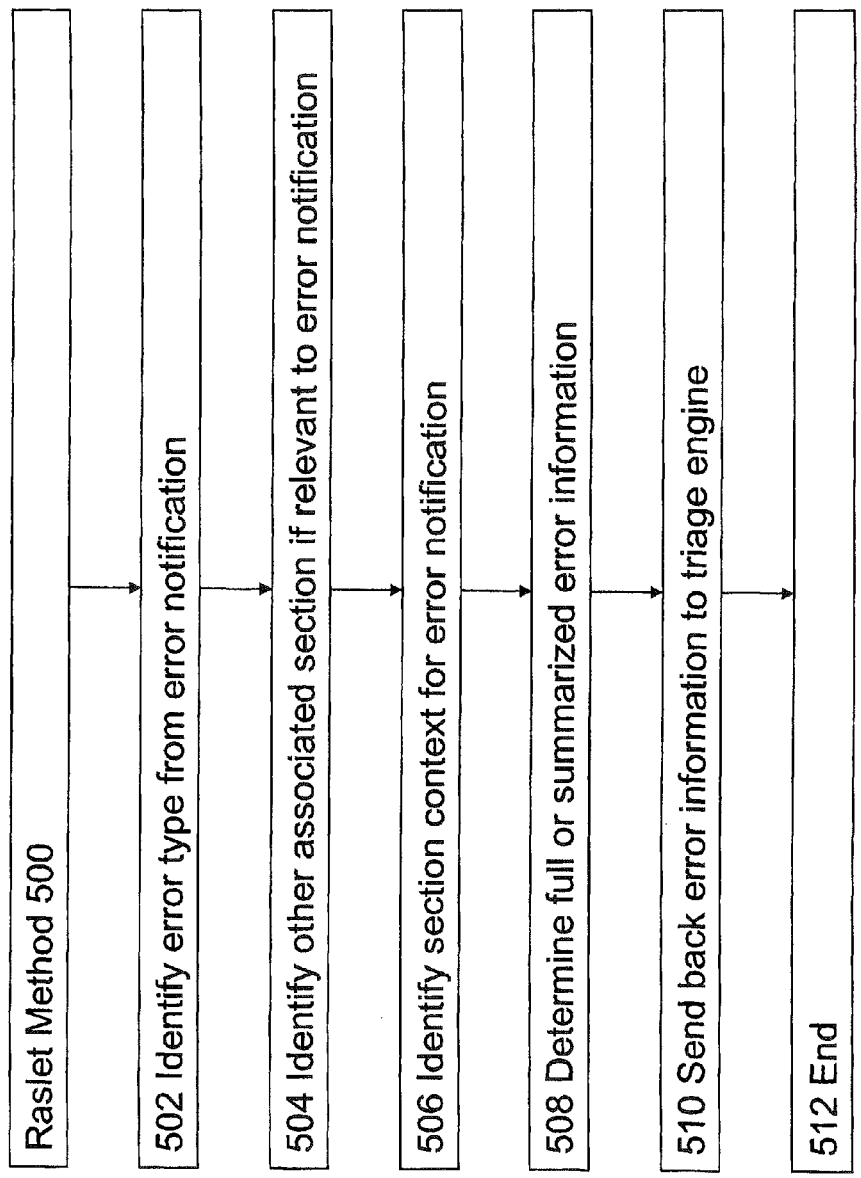
FIG. 5 is a process diagram showing process logic steps of a "raslet" method in accordance with an embodiment.

FIG. 5 is process diagram showing process logic steps of raslet method 500 in accordance with an embodiment. In an exemplary embodiment, raslet method 500 is performed by a raslet (e.g., raslet 50A, raslet 50B, raslet 50C) and includes process blocks 502 to 512.

Block 502 is for identifying an error type from an error notification.

Block 504 is for identifying any other sections, raslets or other entities known by this raslet and associated with the error notification.

Block 506 is for identifying context and facts within the section associated with the error notification.

Block 508 is for determining the available error information and for determining, based on the section parameters, whether a full image or summarized error information is appropriate.

Block 510 is for sending the error information back to the triage component.

Block 512 is the end of the process where control is returned to the triage component.

Figure 6:
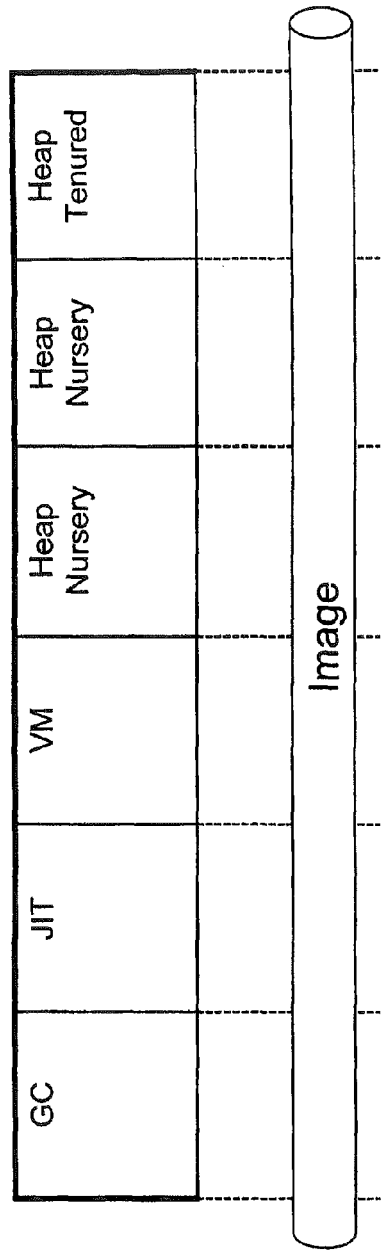
FIG. 6 is an example diagram showing the core file of the whole system image produced by the prior art.

Referring to FIG. 6, an example of division of an application into components is shown. A typical prior art scenario shows the entire address space image of the application dumped into a core file after an error in the just-in-time (JIT) code.

Referring now to FIGS. 7 to 11, states of building a diagnostic file according to an exemplary embodiment is generally shown.

Figure 7:
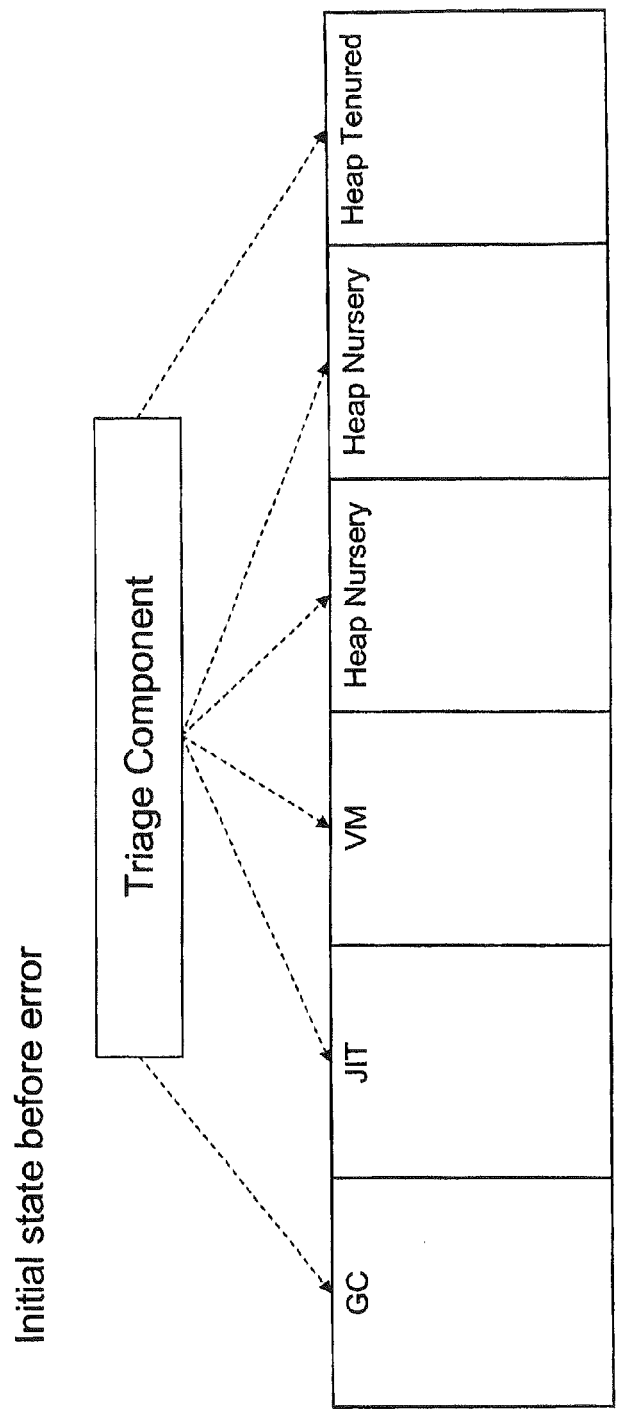
FIGS. 7 to 11 depict state diagrams showing a core file being built by the exemplary embodiments.

FIG. 7 is a first state diagram showing the initial state of the example before an error. The example comprises six system sections of a JVM, each section containing a raslet and each raslet communicating with the triage component. In the example, the JVM comprises a GC section; a JIT section, a VM section; two nursery heap sections and a tenured heap section. No error has occurred as yet. Communication paths from the triage component to the raslets are shown as dotted lines.

Figure 8:
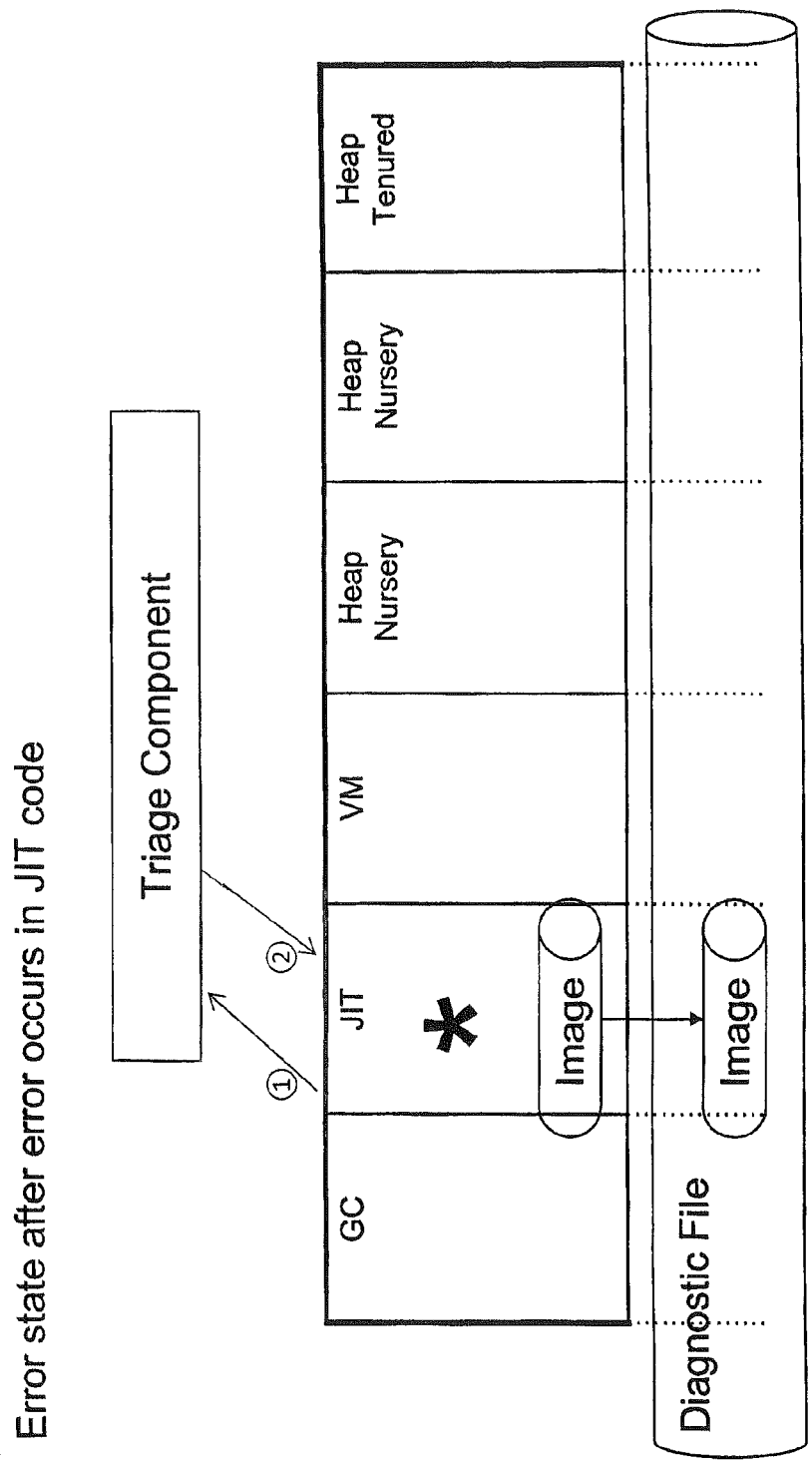

FIG. 8 is a second state diagram after an error has occurred in the JIT indicated by a star. The triage component is informed (Arrow 1) of the error and requests (Arrow 2) the raslet in the JIT to send back an error report. Since the error occurred in the JIT, then the JIT raslet determines that a full error report is needed and transfers a full report and requests that a full image of the JIT be made. The triage component directs saving of the image and this is indicated by the cylinder below the JIT box labelled "Image."

Figure 9:
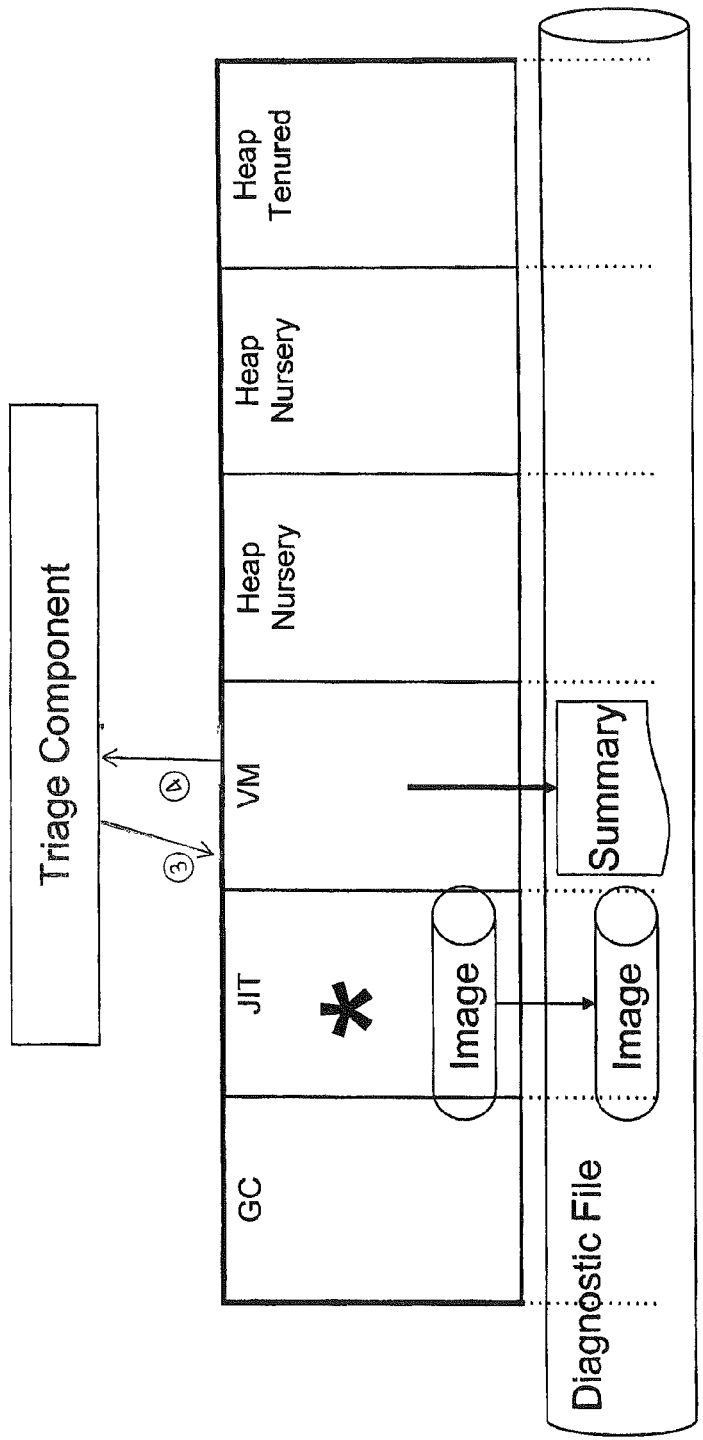

FIG. 9 is a third state diagram showing the triage component requesting (Arrow 3) a raslet in the VM for further error information. The further information is subsequently sent back (Arrow 4) to the triage component. The further information indicates that only a summary of the VM section is needed and this is indicated by the wave shaped box below the VM box labelled "Summary."

Figure 10:
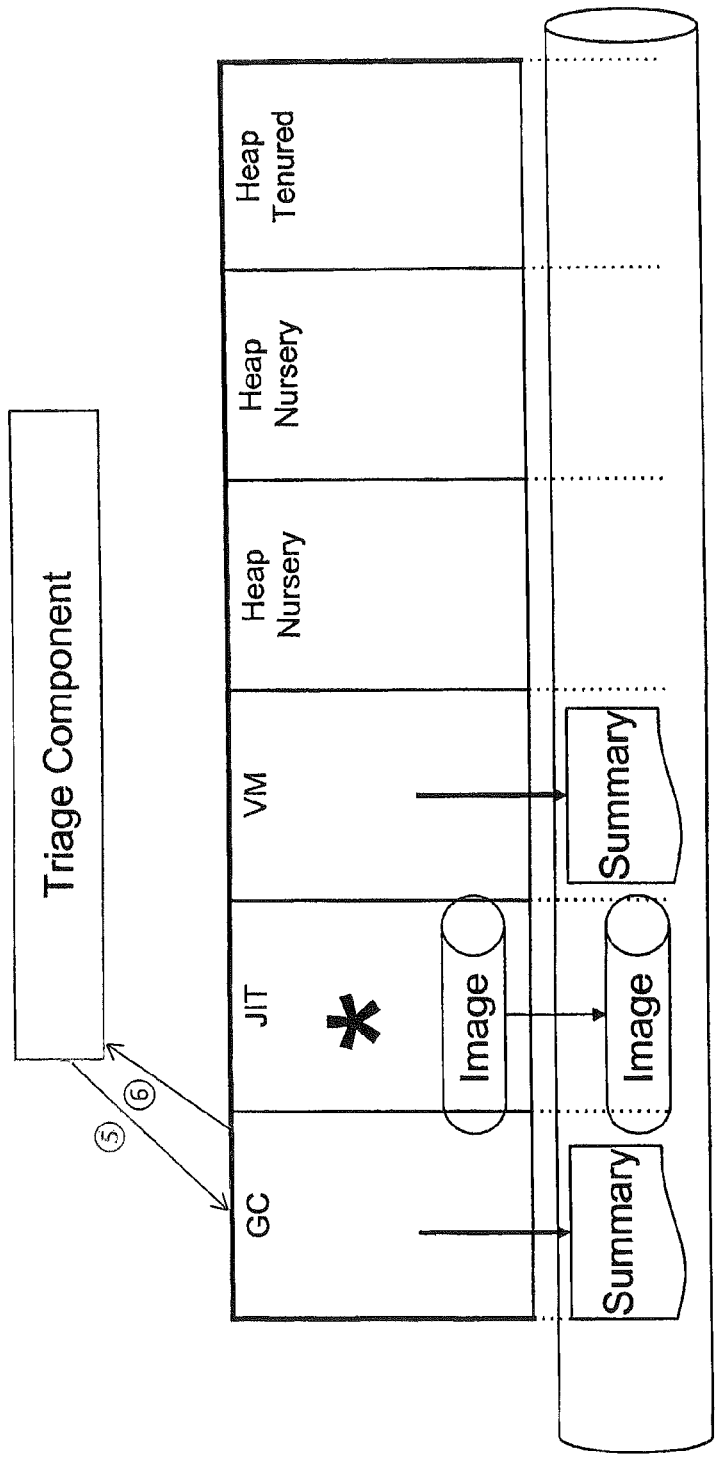

FIG. 10 is a fourth state diagram showing the triage component requesting (Arrow 5) a raslet in the GC for further error information. The further information is sent back (Arrow 6) to the triage component. The further information indicates that only a summary of the GC section is needed and this is indicated by the wave shaped box below the GC labelled "Summary."

Figure 11:
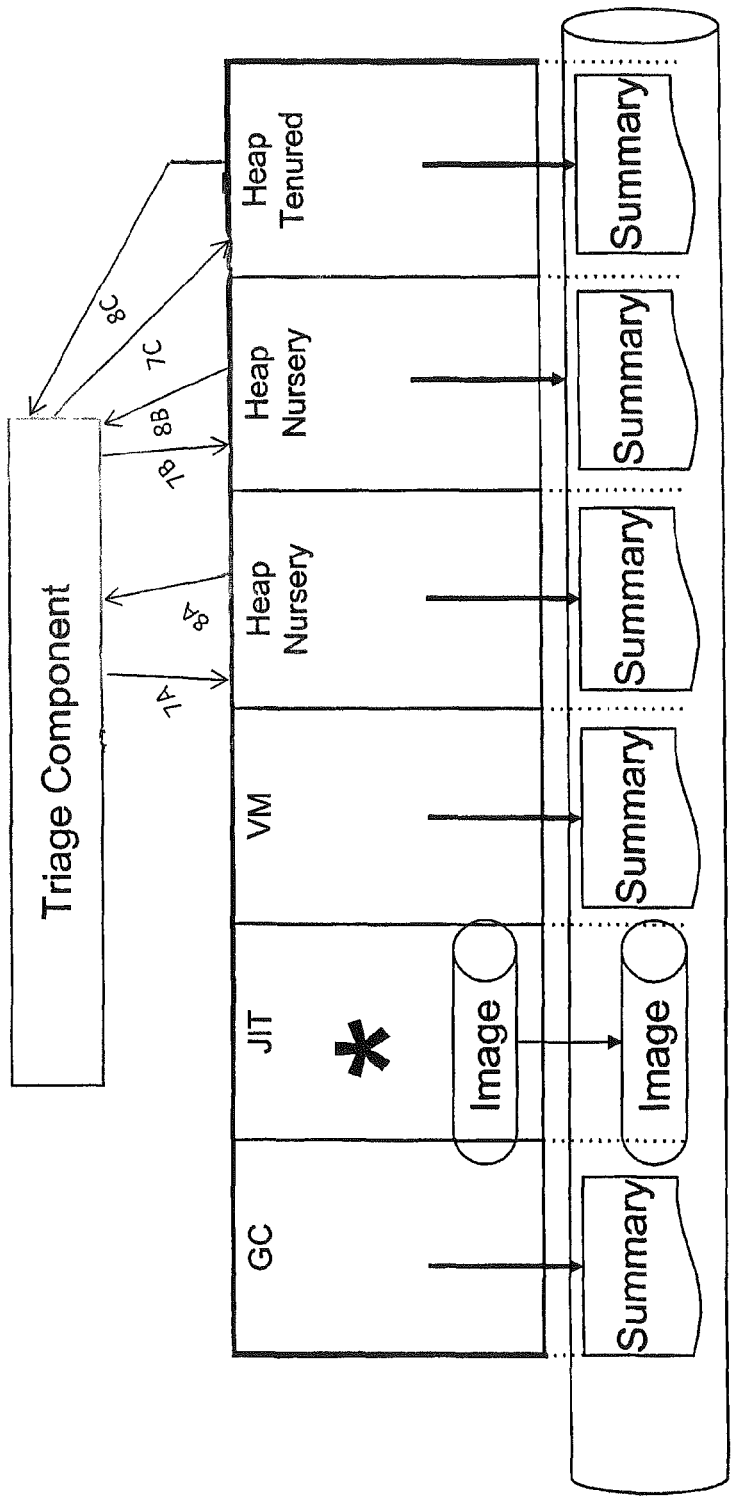

FIG. 11 is a fifth state diagram showing the triage component requesting raslets in the heap nursery and tenured heap sections (Arrows 7A,7B,7C) for further error information. The further error information is sent back (Arrows 8A, 8B, 8C) to the triage component. The further information indicates that only a summary of these sections is needed and this is indicated by the wave shaped boxes labeled "Summary" below the heap nursery boxes.

The diagnostic file of this example is therefore built up from a mixture of information components labeled by image and summary.

An embodiment provides a method for creating a diagnostic file for a failure within a system having a plurality of system sections. The method includes: receiving an error notification indicating that an error has occurred in a particular system section; creating a diagnostic file comprising a full image of the particular system section or a summarized error report of the particular system section depending on information included by the error notification; and saving the diagnostic file including the full image or summarized error report.

Embodiments divide up the address space into a series of system sections, with each section containing a separate dump component with its own pre-allocated working memory, stack and algorithms. When an event occurs that will result in a diagnostic file, each component is invoked. The component analyses the section and decides whether to produce a summary of their section or to produce a complete image of the section. An optional secondary aspect is a core section that spans all the other sections and contains common data. This section will always be present in any given diagnostic file.

An embodiment also includes a system for producing a diagnostic file of targeted images of memory in which an error occurs, together with summarized reports for the areas which are not part of the image. The image could be performed with a partially or completely filled diagnostic file.

Advantages of embodiments described herein include: 1) a reduced size of diagnostic output files especially for large footprint applications; 2) improved reliability of diagnostic data capture, provided by the self-contained dump components with pre-allocated data areas; 3) faster production of diagnostic output, allowing improved application availability; and 4) diagnostics tailored to the nature and location of the failure, and to the requirements of the separate components/sections.

Two examples of schemes that can be used to partition the address space are: dividing the address space into fixed memory sections (for example 100 megabyte); and dividing the address space by functional area.

An embodiment also includes: determining other sections associated with the error in the particular section; creating further full or summarized error reports of the other sections depending on information included by the error signal and the relationship between the sections; and including in the diagnostic file the further full or summarized error reports.

One or more sections can have an error engine associated with the respective section to determine whether a full or summarized error report is created. Furthermore, the system can further include a generic error engine associated with one or sections that are not associated with a dedicated error engine, the generic error engine for determining whether a full or summarized error report is created.

In an embodiment, each section in the system is a subset of system memory.

In an embodiment, each section in the system is a system component.

In an embodiment, the error signal contains information relating to the time that the error occurred, the type of error that occurred and the section associated with the error occurrence. Optionally a textual message is passed in the error signal.

An embodiment also includes creating the sections by dividing the memory address space of the system into self-contained functional sections by separating one or more defined execution components.

An embodiment includes a system for creating a diagnostic file for a recording a failure within a plurality of systems sections. The system includes: an error buffer for receiving an error notification indicating that an error has occurred in a particular section of the plurality of systems sections; and an error engine for creating a diagnostic file for a full image or summarized error report of the particular section depending on information included by the error notification and for saving the diagnostic file including the a full image or summarized error report.

In an embodiment, the error engine is also for determining other sections associated with the error in the particular section and creating further full or summarized error reports of the other sections depending on information included by the error signal; and including in the diagnostic file the further full image or summarized error reports.

In an embodiment, the error engine is a master error engine for determining whether a full image or summarized error report is created and the system further comprises one or more slave error engines, each specifically associated with one or more sections for determining whether a full or summarized error report is created for the respective one or more sections.

In an embodiment, the master error engine is a triage component and the one or more slave engines are self-contained error engines. The above feature is a master/slave embodiment but other embodiments could be peer-peer, with one component detecting the problem, acting as the triage component in this instance, and notifying the other components.

It will be clear to one of ordinary skill in the art that all or part of the embodiments described herein may suitably and usefully be embodied in additional logic apparatus or additional logic apparatuses, comprising logic elements arranged to perform the steps of the method and that such logic elements may comprise additional hardware components, firmware components or a combination thereof.

It will be equally clear to one of skill in the art that some or all of the functional components of the embodiments may suitably be embodied in alternative logic apparatus or apparatuses comprising logic elements to perform equivalent functionality using equivalent method steps, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Embodiments of the present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Embodiments may be realized in the form of a computer implemented method of deploying a service comprising steps of deploying computer program code operable to, when deployed into a computer infrastructure and executed thereon, cause the computer system to perform all the steps of the method.

Embodiments may also be realized in the form of a data carrier having functional data thereon, said functional data comprising functional computer data structures to, when loaded into a computer system and operated upon thereby, enable said computer system to perform all the steps of the method.

In a further alternative, embodiments are realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiments without departing from the scope of the present invention.

The invention claimed is:

1. A method for creating diagnostic files, the method comprising:
   receiving an error notification indicating that an error has occurred in a particular system section of a system having a plurality of system sections, the error notification including information about the error;
   selecting one of:
      creating a full image of the particular system section; and
      creating a summarized error report of the particular system section without creating the full image of the particular system section,
      the selecting based on the information in the error notification;
   creating a diagnostic file comprising one of the full image of the particular system section and the summarized error report of the particular system section, wherein contents of the diagnostic file are based on the selecting; and
   saving the diagnostic file.

2. The method of claim 1, further comprising:
   determining another system section of the system that is associated with the error in the particular system section;
   creating one of a full image of the other system section and a summarized error report of the other system section based on the information included in the error notification and a relationship between the particular system section and the other system section; and
   including, in the diagnostic file, one of the full image and the summarized error report of the other system section.

3. The method of claim 2, wherein one or more of the plurality of system sections have a dedicated error engine associated with the respective system section to determine whether to create a full image or a summarized error report for the respective system section.

4. The method of claim 3, wherein the system includes a generic error engine associated with one or more of the plurality of system sections that are not associated with a dedicated error engine, said generic error engine for determining whether to create a full image or a summarized error report.

5. The method of claim 4, wherein the generic error engine is a master error engine for controlling the one or more dedicated error engines, wherein the dedicated error engines are slave error engines.

6. The method of claim 4, wherein the generic error engine and the one or more dedicated error engines have a peer-peer relationship, with any of the error engines detecting the error, acting as master error engine, and notifying other error engines.

7. The method of claim 1, wherein each of the plurality of system sections is a subset of system memory.

8. The method of claim 1, wherein each of the plurality of system sections is a unique system component.

9. The method of claim 1, wherein the information about the error includes information relating to the time the error occurred, the type of error that occurred, and the system section associated with the error occurrence.

10. The method of claim 1, further comprising dividing a memory address of the system into the plurality of system sections, each of the system sections a self-contained functional system section that includes one or more defined execution components.

11. A system for creating diagnostic files, the system comprising:
   a plurality of system sections;
   an error buffer configured to receive an error notification indicating that an error has occurred in a particular system section of the plurality of system sections, the error notification including information about the error; and
   an error engine configured to:
      select between one of:
         create a full image of the particular system section; and
         create a summarized error report of the particular system section without creating the full image of the particular system section,
         the selecting based on the information in the error notification;

create a diagnostic file comprising one of the full image of the particular system section and the a summarized error report of the particular system section, wherein contents of the diagnostic file are based on the selecting; and save the diagnostic file.

12. The system of claim 11, wherein the error engine is further configured to:

determine another system section of the system that is associated with the error in the particular system section;

create one of a full image of the other system section and a summarized error report of the other system section based on the information included in the error notification and a relationship between the particular system section and the other system section; and include in the diagnostic file, one of the full image and the summarized error report of the other system section.

13. The system of claim 12, wherein the error engine includes one or more dedicated error engines associated with the respective system section, the one or more dedicated error engines configured to determine whether to create a full image or a summarized error report for the respective system section.

14. The system of claim 13, wherein the error engine further includes a generic error engine associated with one or more of the plurality of system sections that are not associated with a dedicated error engine, the generic error engine configured to determine whether to create a full image or a summarized error report.

15. The system of claim 14, wherein the generic error engine is configured as a master error engine to control the one or more dedicated error engines, and the dedicated error engines are configured as slave error engines.

16. The system of claim 14, wherein the generic error engine and the one or more dedicated error engines have a peer-peer relationship, with any of the error engines configured to detect the error, to act as master error engine, and to notify other error engines.

17. The system of claim 11, wherein each of the plurality of system sections is a subset of system memory.

18. The system of claim 11, wherein each of the plurality of system sections is a unique system component.

19. The system of claim 11, wherein the information about the error includes information relating to the time the error occurred, the type of error that occurred, and the system section associated with the error occurrence.

20. A computer program product for creating diagnostic files, the computer program product comprising:

a non-transitory computer readable storage medium having program code embodied therewith, the program code executable by a processor to:

receive an error notification indicating that an error has occurred in a particular system section of a system having a plurality of system sections, the error notification including information about the error;

select one of:

create a full image of the particular system section; and create a summarized error report of the particular system section without creating the full image of the particular system section, the selecting based on the information in the error notification;

create a diagnostic file comprising one of the full image of the particular system section and the summarized error report of the particular system section, wherein contents of the diagnostic file are based on results of the determining; and save the diagnostic file.

* * * * *